Feb. 28, 1956 N. P. BROUSSARD 2,736,237
GAS EXPLOSION MEANS FOR A GUN
Filed April 22, 1952 11 Sheets-Sheet 4

INVENTOR,
Nolan P. Broussard.
BY
ATTORNEYS.

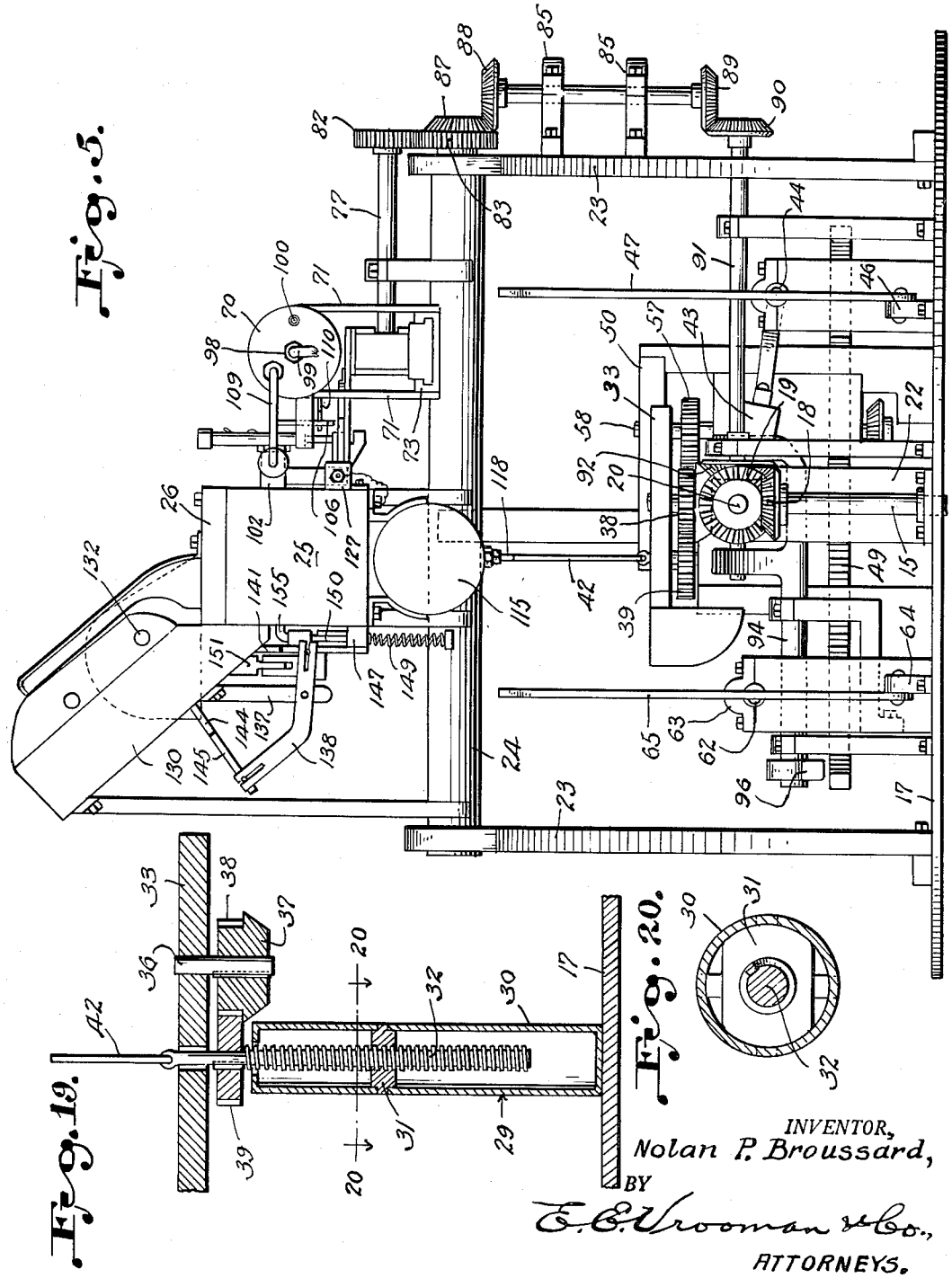

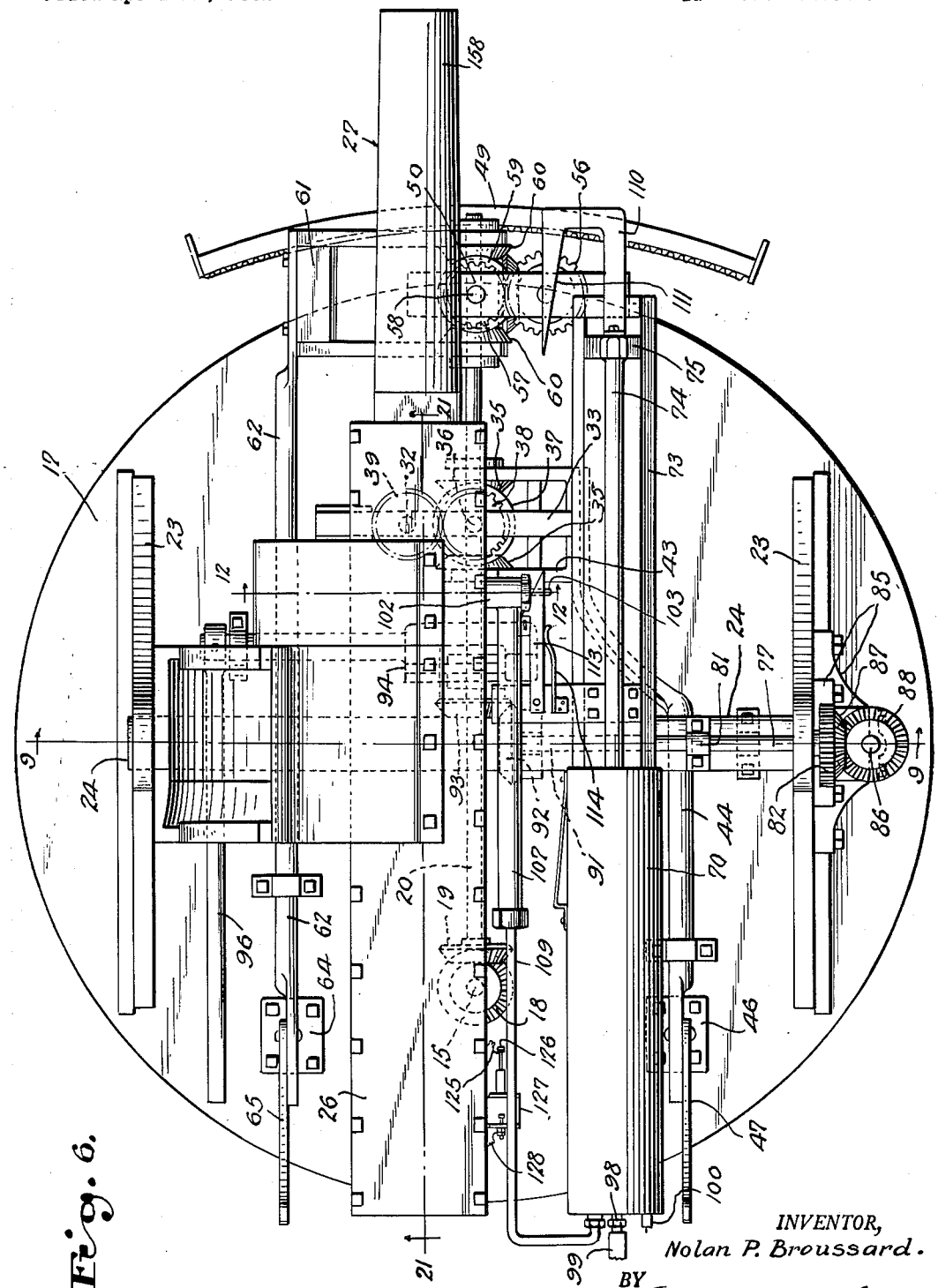

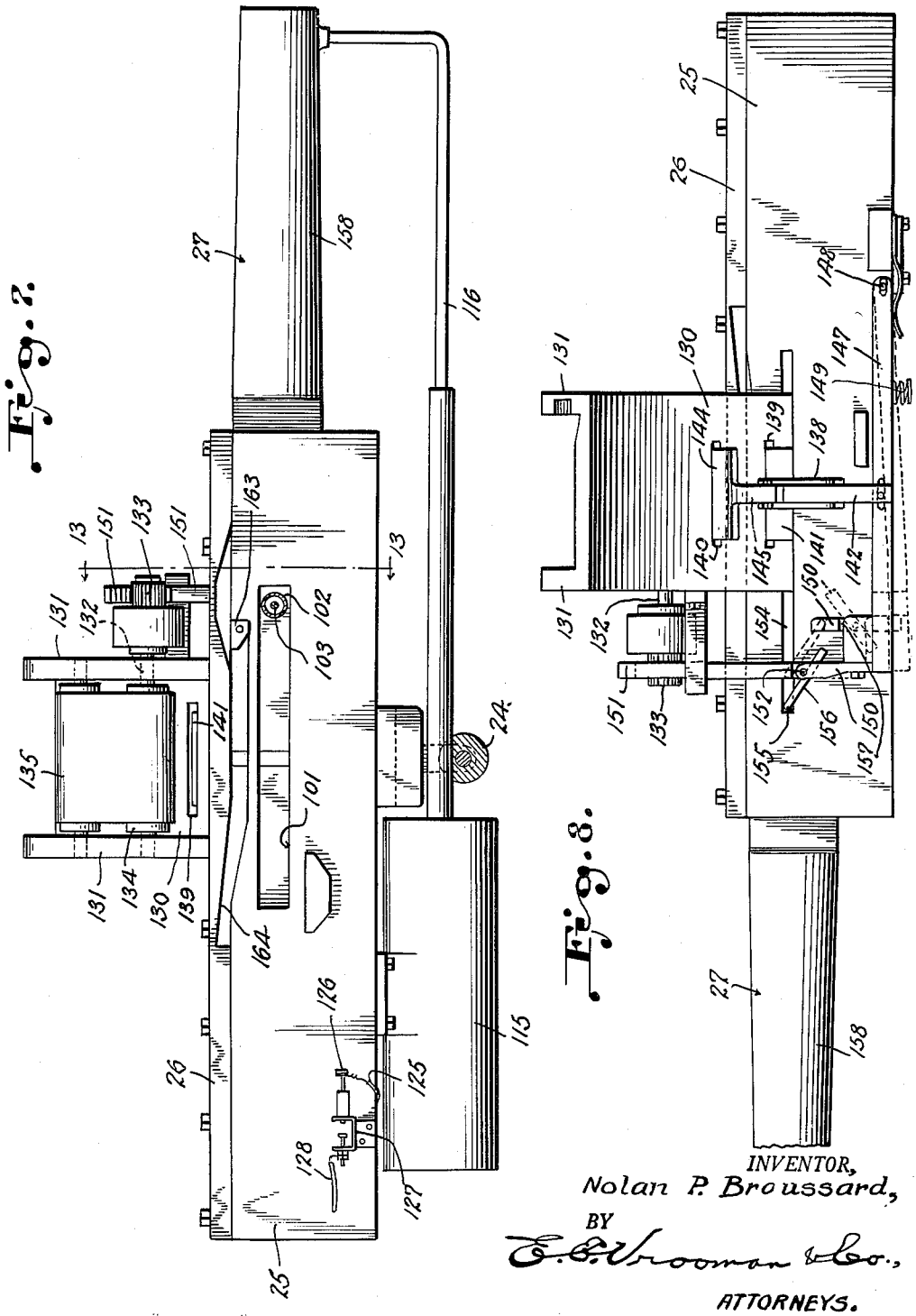

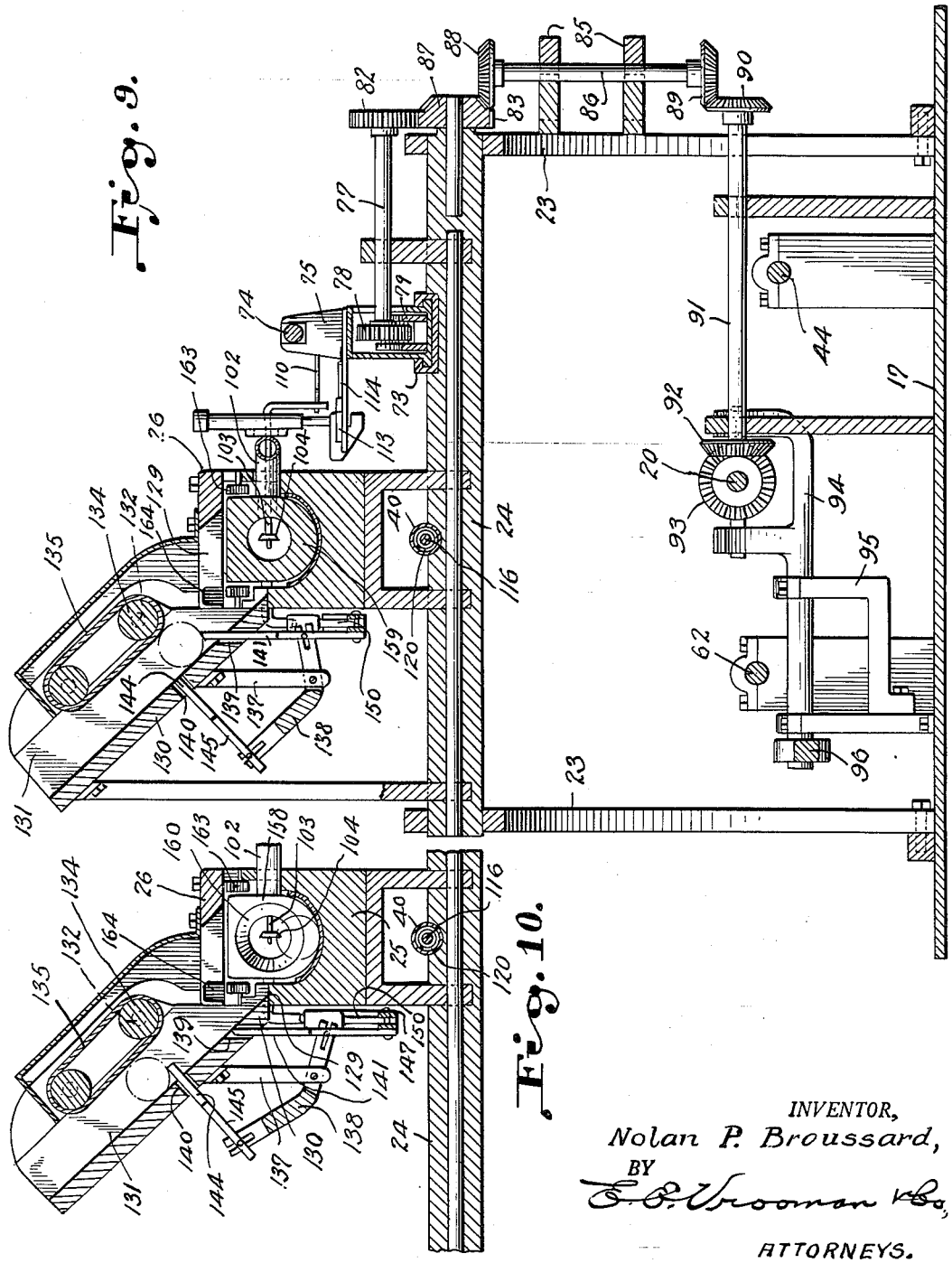

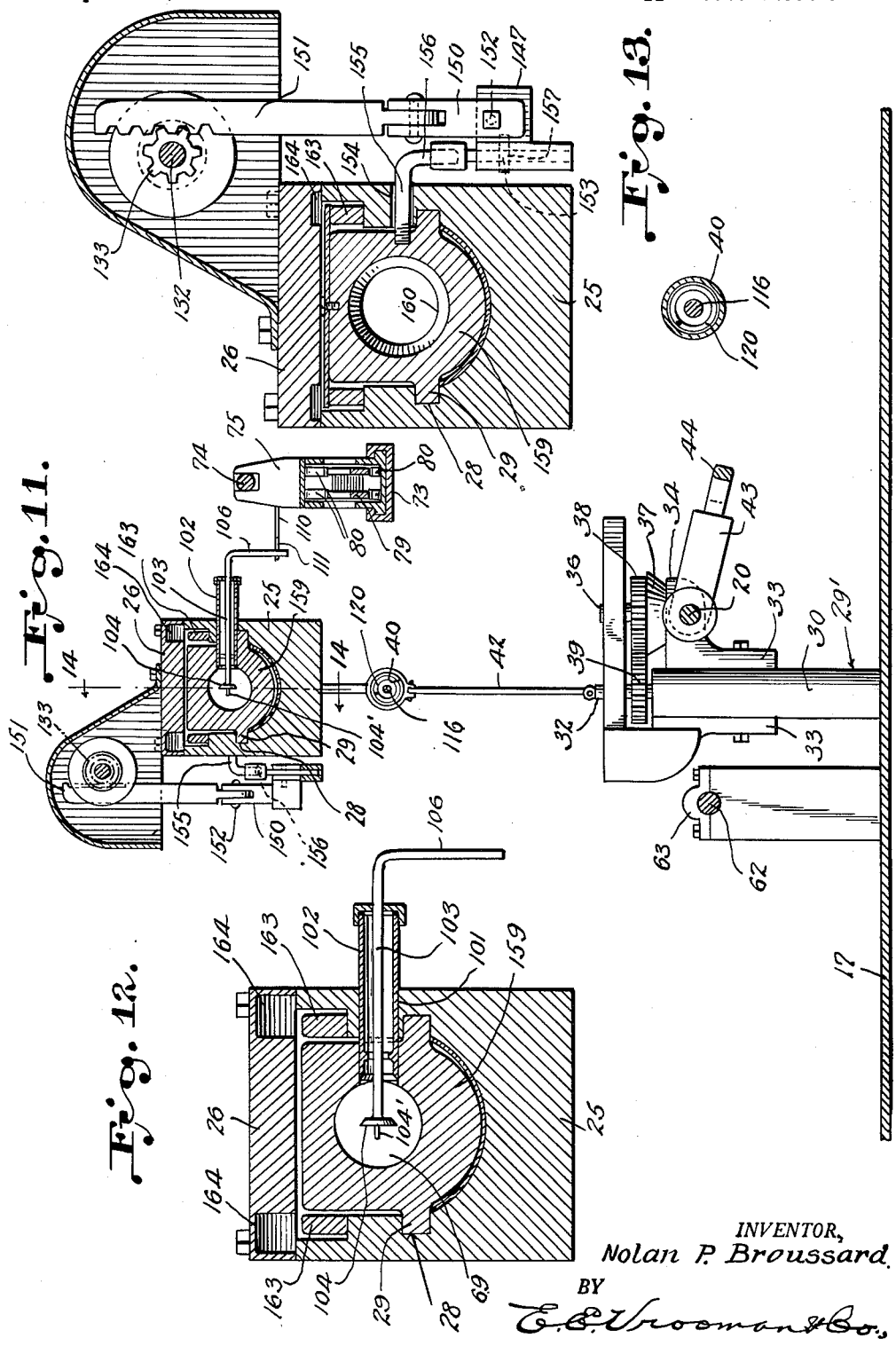

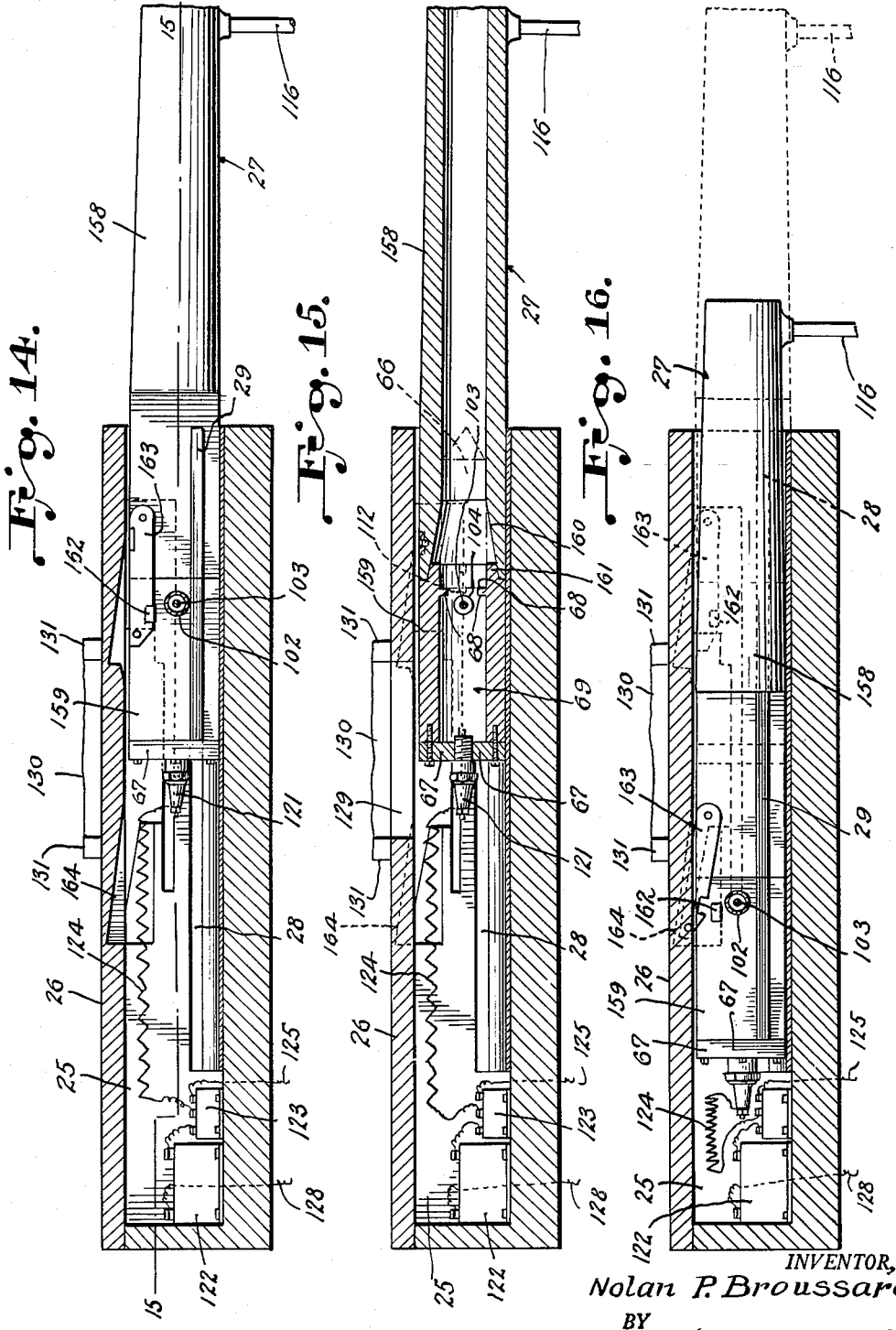

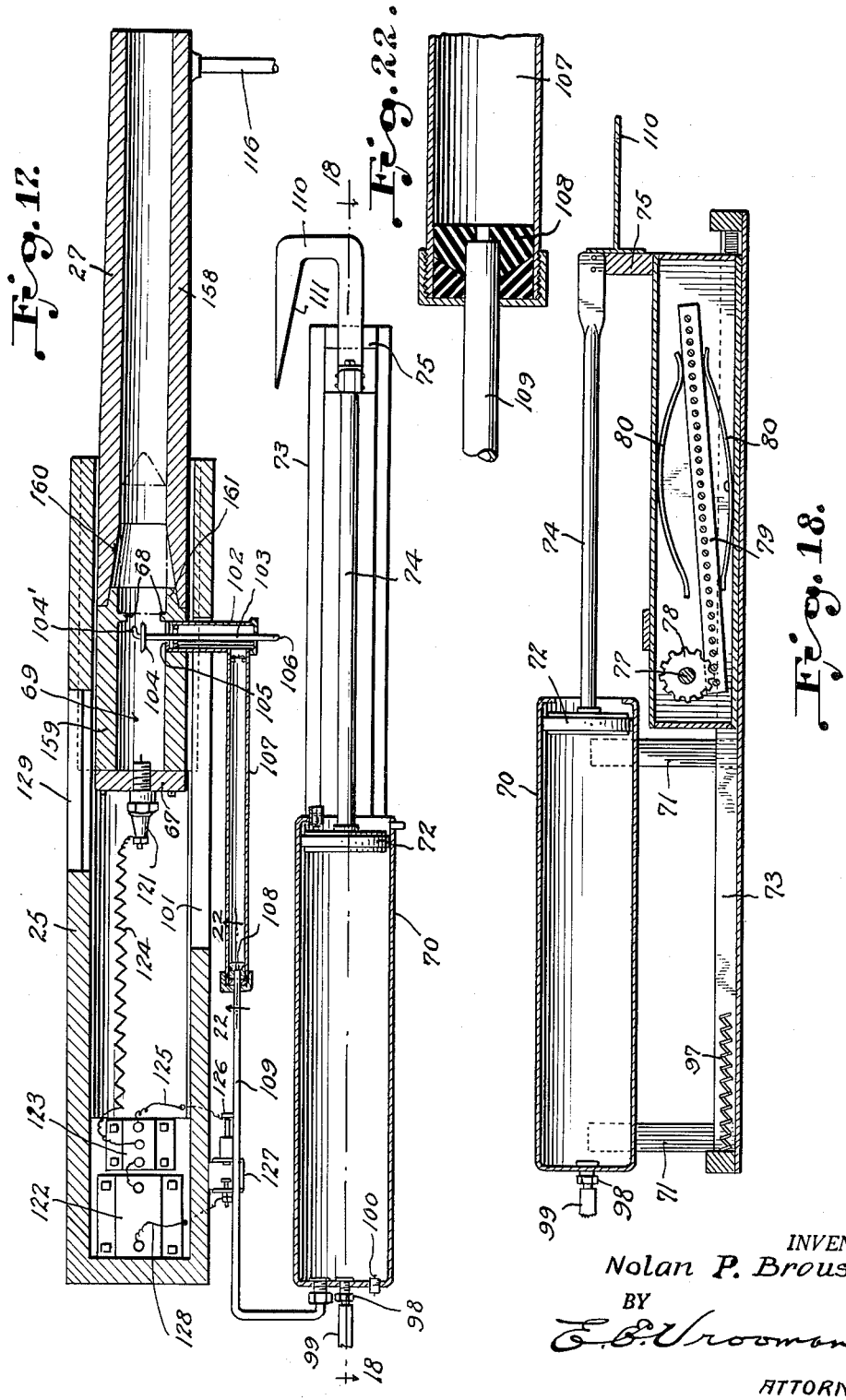

United States Patent Office 2,736,237
Patented Feb. 28, 1956

2,736,237
GAS EXPLOSION MEANS FOR A GUN
Nolan P. Broussard, Kaplan, La.
Application April 22, 1952, Serial No. 283,732
1 Claim. (Cl. 89—7)

This invention relates to guns and gun mounts such as are used on tanks and the like.

One object of the invention is to provide a novel and original gun wherein a projectile is discharged from the gun by the explosion of a compressed explosive mixture such as gas and air or other explosive mixtures of like character.

A second important object of the invention is to provide a novel form of gun wherein a shell may be provided which, while in the gun, can be charged with an explosive mixture such as that which propels the shell from the gun.

A third important object of the invention is to provide a carriage in which a gun is slidably mounted to move longitudinally of the carriage into position for charging with a shell, introducing an explosive charge behind the shell, and moving into position for and producing a spark in the explosive gas behind the shell.

A fourth object of the invention is to provide a reciprocating gun slidable in a carriage into and out of position for loading a shell into the gun through a lateral gate automatically opened and closed alternately by the reciprocating movement of the gun.

A fifth important object of the invention is to provide a novel mount for such a gun carriage and gun, the mount being arranged in such manner that the axis of the gun may traverse to various angular positions with relation to the longitudinal axis of the tank whereon the gun is mounted.

A sixth important object of the invention is to provide means whereby the vertical angle of fire of the gun may be varied at will.

A seventh important object of the invention is to provide means for reciprocation of the gun whereby it may serve to compress a charge of gas and air to a high degree of compression and then to feed this compressed charge into the rear end or firing chamber of the gun bore.

An eighth important object of the invention is to provide a novel arrangement of means for feeding shells successively into the gun through the above-mentioned gate.

A ninth important object of the invention is to provide, in connection with a spark plug extending into the firing chamber of the gun and an electric circuit for the plug, means operated by the movement of the gun in its carriage to a certain position which closes the circuit and thus causing passage of a spark between the terminals of the spark plug.

A tenth important object of the invention is to provide a motor mechanism and gearing for effecting the training and change of elevation angle of the gun, said mechanism being selectively operated by lever means within the tank.

The invention consists in general of certain novel details of construction and combinations of parts hereinafter fully described, illustrated in the accompanying drawings, and particularly claimed.

In the accompanying drawings like characters of reference indicate like parts, and:

Fig. 5 is a view showing in elevation the opposite end of such mechanism.

Fig. 6 is a planned view of the mechanism shown in the preceding figures.

Fig. 7 is a detailed elevation of certain parts of the invention taken from the same side as Fig. 2.

Fig. 8 is a view of the parts shown in Fig. 7, but taken from the side opposite the latter figure.

Fig. 9 is a section on the line 9—9 of Fig. 6 and showing the means for feeding a shell to the gun.

Fig. 10 is a fragmentary view of the mechanism shown in Fig. 9 and showing the means for preventing more than one shell being fed to the gun at the same time.

Fig. 11 is a fragmentary section taken on the line 11—11 of Fig. 2.

Fig. 12 is an enlarged detail of a portion of the mechanism shown in Fig. 11, the view being taken on the line 12—12 of Fig. 6.

Fig. 13 is a detailed section on the line 13—13 of Fig. 7.

Fig. 14 is a fragmentary section taken on the line 14—14 of Fig. 11, the view showing the position of the gun at the time of firing.

Fig. 15 is a view similar to Fig. 14 but also showing the gun in sections.

Fig. 16 is a view similar to Fig. 14 but showing the gun fully retracted.

Fig. 17 is a detailed section taken on the line 17—17 of Fig. 14.

Fig. 18 is a fragmentary view in section on the line 18—18 of Fig. 17.

Fig. 19 is a detailed section on the line 19—19 of Fig. 3.

Fig. 20 is an enlarged detailed section on the line 20—20 of Fig. 19.

Fig. 21 is a fragmentary section on the line 21—21 of Fig. 6.

Fig. 22 is a greatly enlarged section on the line 22—22 of Fig. 17.

Figure 1:
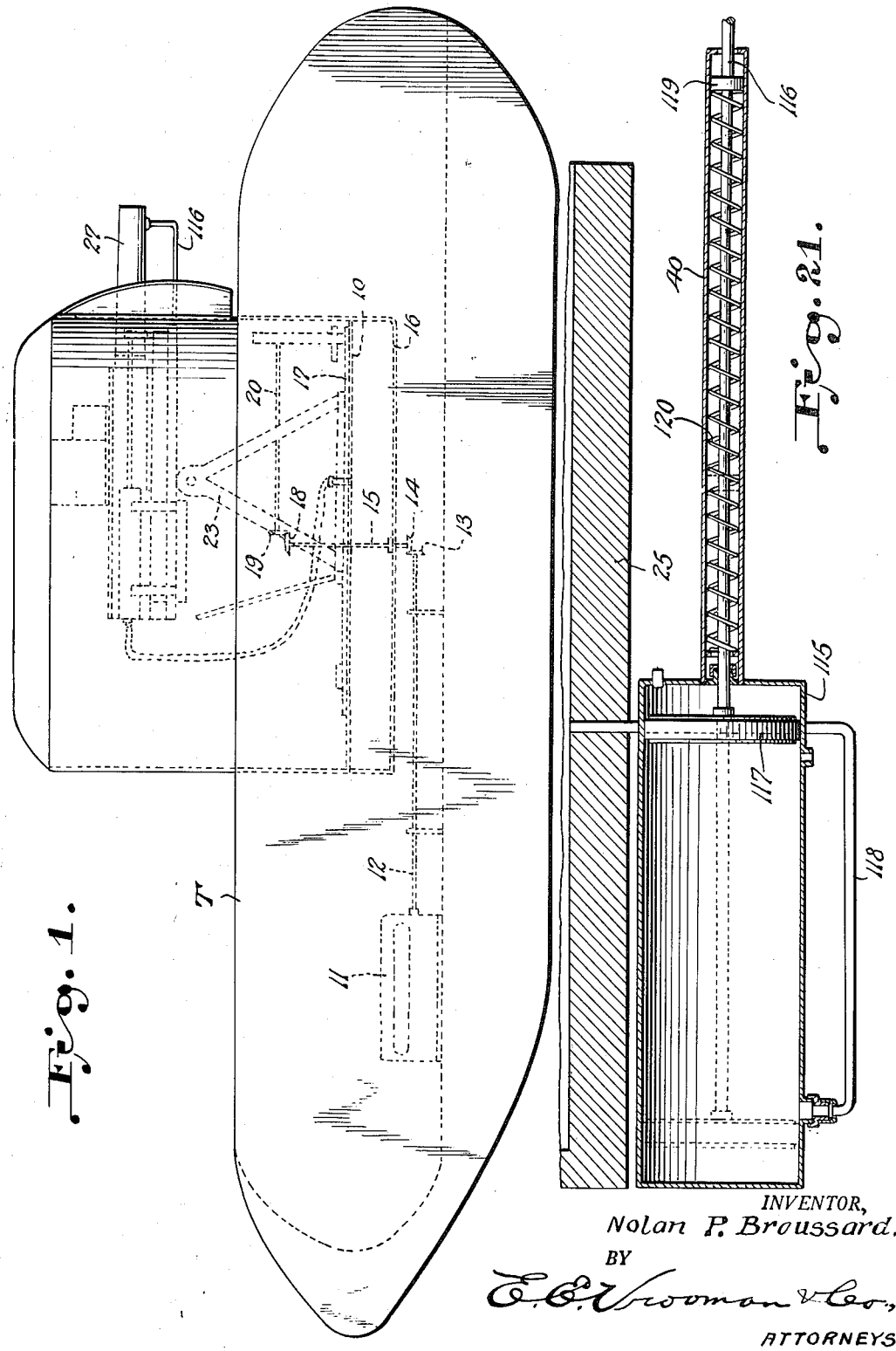
Fig. 1 is a side elevation of a tank wherein the apparatus forming this invention is mounted, the tank is shown in outline, as is also a protective hood or turret, and the mechanism being indicated in general by broken lines.
Figure 2:
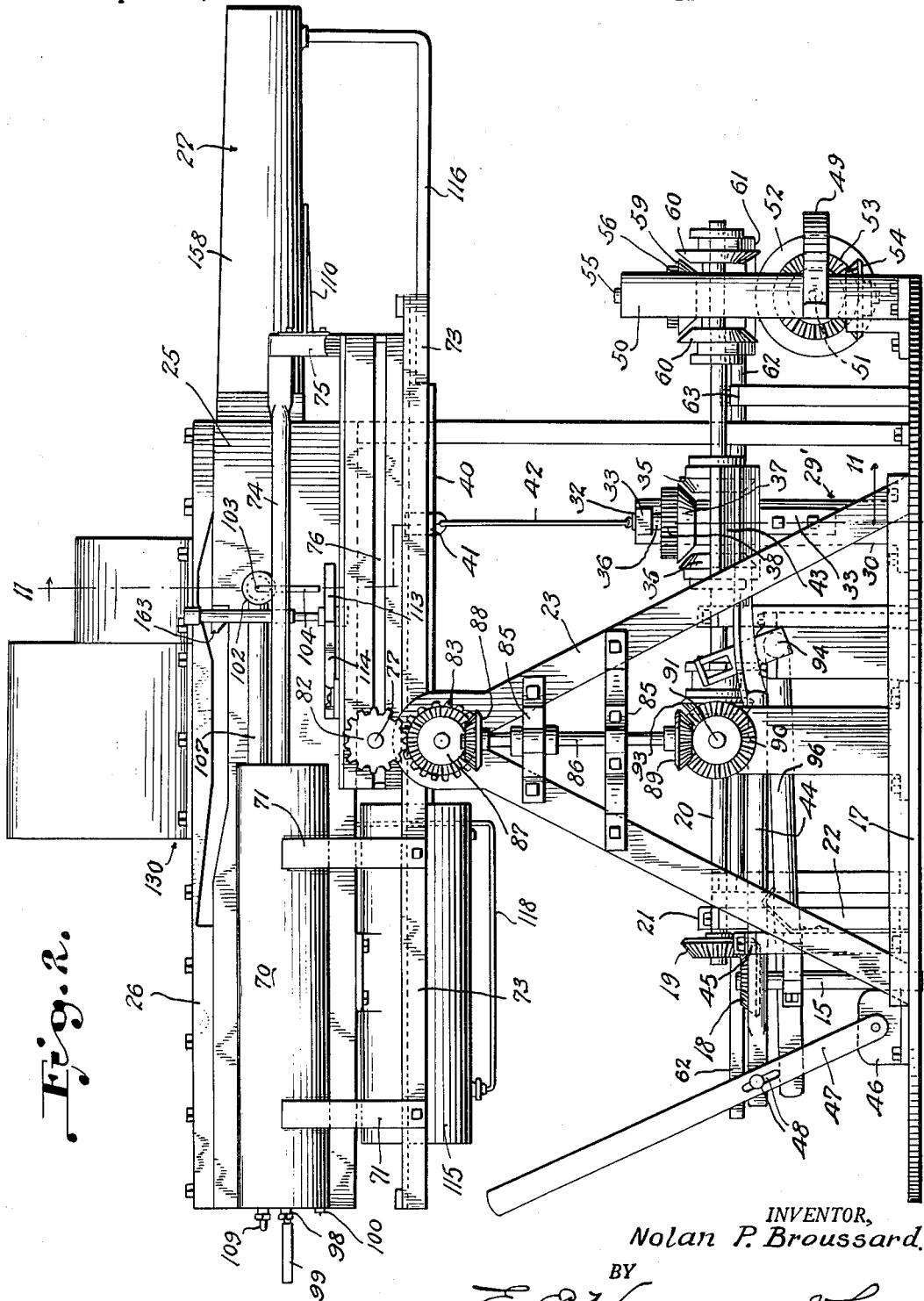
Fig. 2 is a side elevation of the main portion of the mechanism removed from the tank, the view disclosing the right hand side of such mechanism with the observant looking from the rear to the front of the gun.

The structure forming the present invention is preferably applied to a tank having a stationary platform 10 extending from side to side of the tank. In the tank there is an engine or motor 11 which drives a shaft 12. This shaft 12 carries a bevel gear 13 which meshes with a bevel gear 14 mounted on a vertical shaft 15. Within the tank, preferably below the platform 10, is a gas storage receptacle 16. It is to be understood that the word "gas" as used in this specification is to be taken as broad enough to apply to a true gas or to a vaporized liquid such as gasoline, the gas being any substance which combined with air and heavily compressed will have explosive power when ignited.

On the platform 10 is located a rotary platform 17 through which the shaft 15 extends. This shaft 15 carries on its upper end a bevel gear 18 which meshes with a bevel gear 19 on a main shaft 20, supported in bearings 21 mounted on pedestals 22 secured to the rotary platform 17. Extending up from the rotary platform 17 is a spaced pair of A-frames 23 connected at their upper ends by a trunnion member 24. Fixed on this trunnion member is a carriage 25 having a trough shaped body closed at its top by a closure 26. Projecting from the forward end of the carriage is a gun 27 which is movable between the projected position shown in Figure 15 to the retracted position shown in Figure 16. In the sides of the carriage are formed longitudinally extending grooves 28 and the breech portion of the gun is provided with ribs 29 fitting in the grooves 28 and guided thereby so that the axis of the gun bore remains parallel to the axis of the carriage at all times.

In order to provide proper vertical angle of fire of the gun an elevating mechanism is employed as indicated in chart at 29 and best seen at Figure 11. This elevating mechanism includes a cylinder or housing 30 having a nut 31 fixed therein. Through the nut 31 extends a screw 32. A bracket 33 is bolted to the cylinder 29 and has an arm 34 where through passes the shaft 20. On the shaft 20 is mounted a spaced pair of confronting bevel disks 35. The bracket 33 carries a stub shaft 36 on which is mounted a bevel disk 37 which normally is out of mesh with both of the disks plates 35. Carried by the disk plate 37 and rotating therewith is a spur gear 38 which meshes with a spur gear 39 splined on the upper end of the screw 32. These bevelled gear-plates are not provided with teeth but are lined with material, such as brake-lining. Supported below the carriage in fixed parallel relation therewith is a housing tube 40 around which extends a band 41 connected to the top of the screw 32 by a rod 42, the connection being such as to provide swiveling motion (not shown). The disks 35 are maintained in spaced relation by a shifter head 43 carried by a shifter rod 44 extending through guides 45 parallel to the shaft 20. A bracket 46 is fixed on the platform 17 and pivoted on this bracket is the lower end of a shifter lever 47 having pin and slot connection at 48 with the rod 44.

The shaft 20 constantly revolves in the same direction but by the action of the lever 47 one or the other of the disks 35 may be caused to mesh with the disk-like plate 37 and thus the screw 32 may be caused to rotate in either direction as desired. Obviously when the screw is rotated in one direction it will rise through the nut and the forward end of the carriage will be tilted upwardly while when the screw is revolved in the opposite direction the forward end of the carriage will be pivoted downwardly. This will carry the gun with it and by the means just described the range at which the projectile will reach may be varied at will.

It is also desirable to provide for training the gun in any desired direction. In the mechanism for this purpose there is provided an arcuate gear segment 49 fixedly supported from the stationary platform 10, the teeth being on the side of the segment confronting the end of the shaft 20. Mounted on the rotatable platform at the forward end thereof is a frame 50 supporting a shaft 51 on which is fixed a worm 52. On the shaft 51 is also fixed a bevel gear 53 which meshes with a bevel gear 54 on the lower end of a vertical shaft 55 supported in said frame. On the upper end of the shaft 55 is fixed a spur gear 56 which meshes with a spur gear 57 mounted on a stub shaft 58 supported in the frame 50. Fixed to the spur gear 57 is a bevel disk 59. On the shaft 20 is a spaced pair of bevel disks 60 normally out of mesh with the disk 59. The position of the disks 60 is controlled by a shifter head 61 and carried by a shifter rod 62 supported in guides 63. Fixed to the rotary platform 17 is a bracket 64 whereto is pivoted the lower end of a lever 65 having pin and slot connection with rod 62 as in the manner previously described.

By means of this arrangement the disk 60 may be selectively meshed with the bevel disk-like plate 59 and thereby rotate the worm in one direction or the other as may be desired, thus effecting training of the gun to the right or left.

In the side of the gun there is provided means, presently to be described, for introducing a projectile 66 which preferably is of the character of a shell. When introduced the shell is seated well in advance of the breech closure 67, seating stops 68 being provided to insure spacing of the shell from the closure so as to form a combustion chamber 69. Prior to firing the gun a highly compressed charge of an explosive mixture of gas and air is introduced into the combustion chamber 69. To accomplish this purpose there is positioned alongside of the carriage a compression cylinder 70 supported by standards 71 from the guide member 13. In the cylinder 70 is mounted a piston 72. Between the lower ends of the standard 71 is a guide member 73 which extends forwardly from the trunnion. A piston rod 74 extends from the piston 72 and has its end supported on a cross-head 75 slidable in the guide 73. This cross-head is preferably in the form of a housing rectangular in cross section and is provided with a slot 76 wherethrough passes a shaft 77 carrying a gear 78 which meshes with a rack 79 tiltedly mounted in the member 75 between springs 80 as best shown in Figure 18. The shaft 77 is supported by a bearing 81 rising from the trunnion 24 and on the outer end of this shaft is a spur gear 82 which meshes with a gear 83 extending from the trunnion. Carried by an A-frame 23 are bearing brackets 85 supporting a vertical shaft 86. The gear 83 carries a bevel gear 87 which meshes with a bevel gear 88 fixed on the shaft 86. At the lower end of the shaft 86 is a bevel gear 89 which meshes with a bevel gear 90 fixed on a transverse shaft 91. At its inner end the shaft 91 carries a bevel gear 92. On the shaft 20 is a bevel gear 93 splined on the shaft and movable into and out of meshing engagement with the gear 92 by means of a shifter 94 mounted rockingly in a bracket 95 and operated by a lever 96. By this means the piston 72 may be operated as desired.

At the end of the guide 73 there is positioned a coiled check spring 97 the purpose of which is to check the movement of the cross-head gradually as the piston reaches the end of its stroke. In the rear end of the cylinder 70 is fitted a needle valve 98 which is connected to the gas tank 16 by means of a pipe 99. Also there is provided at the same end of the cylinder an air inlet check valve 100. A slot 101 extends through the wall of the carriage adjacent to the compression cylinder and through this slot passes a valve housing 102 which is screwed into the side of the gun. Extending axially of the housing 102 is a valve stem 103 which carries on the inner end a valve 104 closing on a valve seat 105 fixed at the inner end of the valve housing 102. The valve stem 103 passes slidably through the outer end of the valve housing 102 and is provided with an angularly disposed arm 104'. Extending rearwardly from the housing 102 and opening therein to a charge measuring cylinder or tube 107 wherein is located a piston 108 carried on the end of a pipe 109 which connects to the rear end of the cylinder 70 as clearly shown in Figure 17. The piston 108 is so shaped and constructed as to form a check valve. Now when the gun is retracted from the position shown in Figure 17 the piston 108 will remain stationary while the charge measuring cylinder 107 will slide over the pipe 109. As the piston moves rearwardly in the cylinder 70 air drawn in through the check valve 100 and gas drawn in through the needle valve 98 will be compressed and the compressed gas will be forced through the pipe 109 into the measuring cylinder 107 and from there into the housing 102 which will cause the valve 104 to open. The cross-head 75 carries a J-shaped projection 110 having a cam surface 111 which engages the angled end 106 of the valve stem and thereby forces the valve 104 to rest on its seat. When the piston 72 moves forward into cylinder 70 a fresh supply of air and gas will be drawn in ready for the next compression thereof. The projectile 66 has at its rear end an inlet valve 112 and the valve stem 103 has a lug which engages the valve 112 to open the same as the combustion chamber is charged and acts to close the same when the cam engages the arm 106. Moreover it is to be noted that the valve 104 is normally held open by the action of a pivoted arm 113 having its free end urged inward by a spring 114 as shown in Figure 6. From the foregoing it will be seen that the combustion chamber and shell are charged at the same time. The particular construction of the shell is not here shown but will be described and illustrated in a further application.

In order to effect protraction of the gun after the recoil of fire has retracted this gun the means illustrated in Figure 21 is used. In this figure it will be seen that the housing 40 is connected to the forward end of a cylinder 115 which is closed at both ends. The front end of the gun has a rod 116 secured at one end thereto, the rod extending downwardly from the gun muzzle and then axially through the housing 40 into the cylinder 115. On the end of this rod within the cylinder is mounted a tight fitting piston 117. A bypass pipe 118 is connected at each of its ends to the side wall of the cylinder 115, the connections being made at points more distant from the adjacent head of the cylinder than is the thickness of the piston. On the rod 116 within the housing 40 is mounted a collar 119 and between this collar and the rear end of the housing 40 the rod is surrounded by a coiled compression spring 120. With this construction, as the gun retracts the piston 117 will be moved to the left of Figure 21 and the air in the left end of the cylinder 115 will be moved through the bypass 118 into the front end of the cylinder. However, as soon as the piston covers the rear inlet of the pipe 118 the air between the piston and the adjacent cylinder end will be compressed and the recoil of the gun will be checked. At the same time the spring 120 will be compressed. Protraction of the gun will then take place by reason of the expansion of the spring 120 and the piston 117 will move to compress some of the air at the forward end of the cylinder 115 so that the protraction movement of the gun is gently checked.

In order to explode the charge in the breech of the gun there is provided a spark plug 121 which is screwed through the breech so that its sparking terminals lie within the combustion chamber. In the rear of the carriage there is provided a battery 122 which is connected to a sparking coil 123. The spark plug 121 is connected to one terminal of the spark coil by a wire or through conductor 124 so arranged, as by forming it in a coil, that it will afford connection in all positions of the gun. From one terminal of the spark coil 123 extends a conductor wire 125 which leads to a plunger element or button 126 of a circuit closer 127. The circuit closer is connected by wire 128 with the battery 122. Thus whenever the button 126 is pressed a circuit will be established from the battery through the spark coil, the wire 124, the spark plug 121 which is grounded on the metal of the gun. The current also flows from the coil through wire 125, the circuit closer 127 and the wire 128 back to the battery 122. Normally this last mentioned circuit is open but upon pushing the button 126 circuit is closed and the spark passes between the points of the spark plug thus firing the charge.

Figure 3:
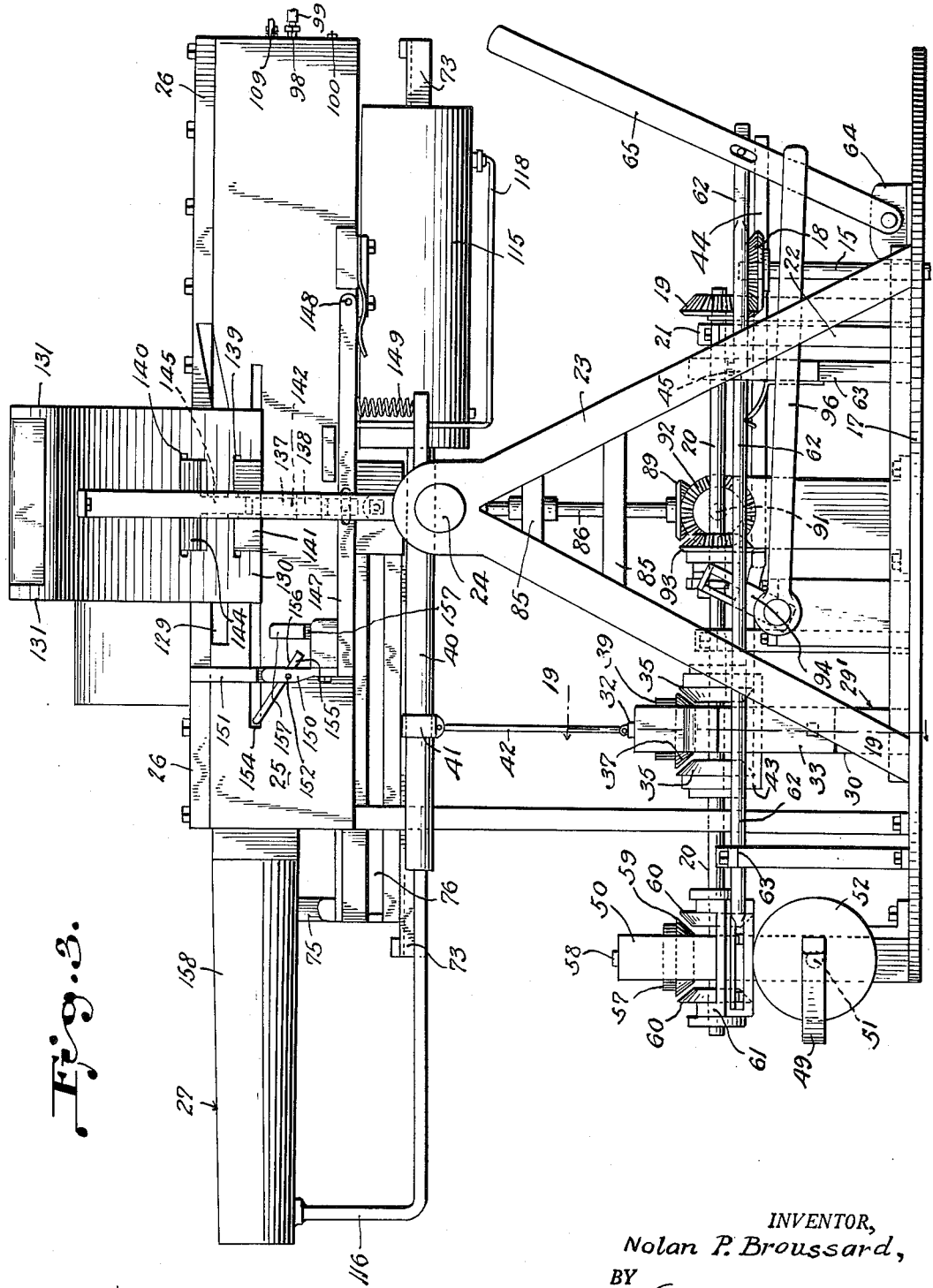
Fig. 3 is a side elevation of the mechanism shown in Fig. 2, but the view being taken from the opposite side of the gun.
Figure 4:
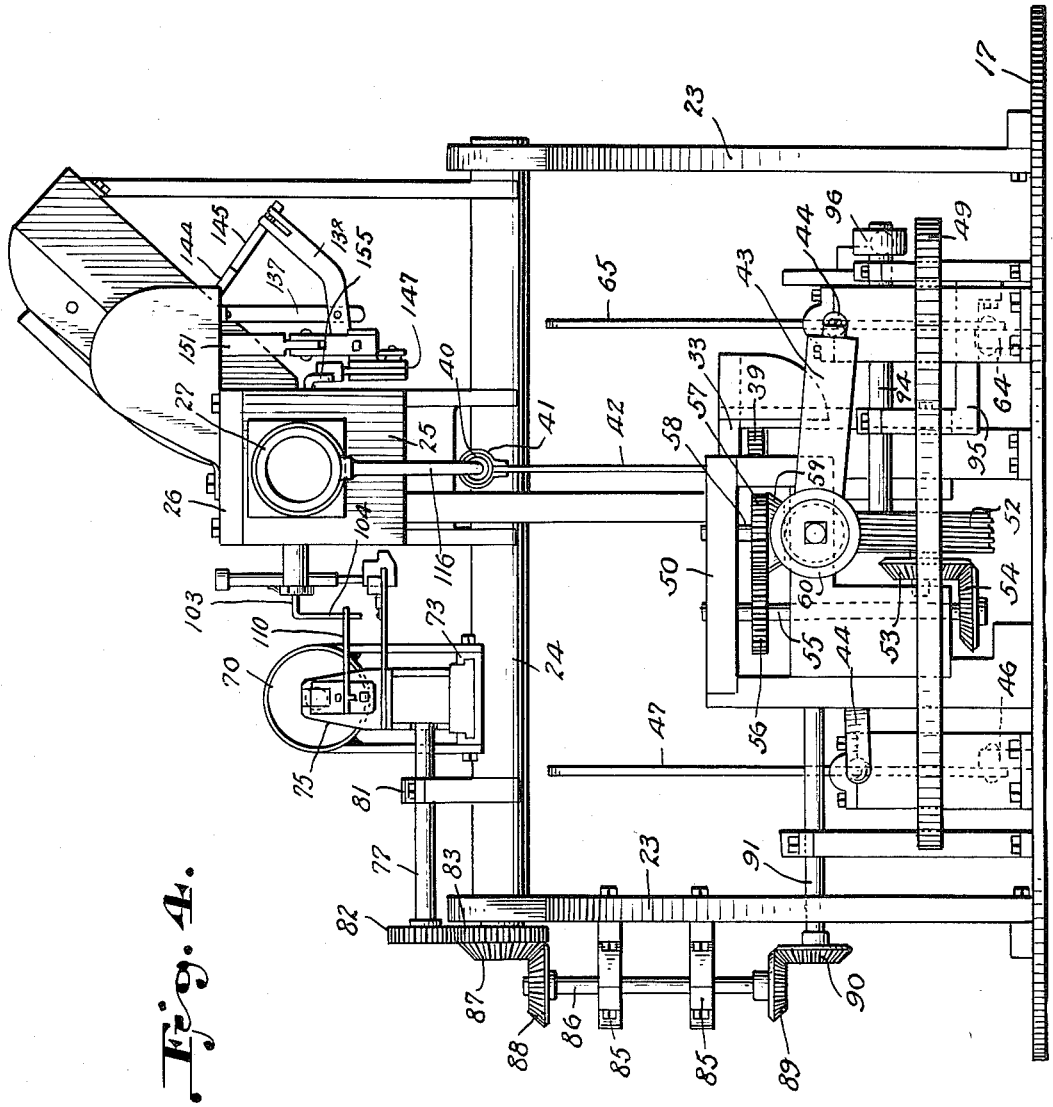
Fig. 4 is an end view of the mechanism shown in Figs. 1 and 2, the view being taken from the muzzle of the gun.

In order to provide means for supplying shells successively to the gun the carriage is cut away intermediate its length as at 129. Leading diagonally upward from the bottom of the opening 129 is the bottom of the chute 130 having side walls 131. Through the lower part of one of the walls 131 extends a shaft 132 having a spur gear 133 mounted thereon. Also mounted on the shaft 132 is a belt pulley 134 connected by a belt 135 with a second belt pulley adjacent the opening 129. The second belt pulley is likewise mounted by journal portions in the side walls of the chute. The lower side of the belt runs parallel to the bottom 130 of the chute at such a distance as to hold the projectile firmly in position on the chute bottom. Projecting downwardly from the chute bottom 130 is a bracket 137. On the bottom end of this bracket there is pivoted an obtusely angled bell crank lever 138. Adjacent the opening 129 the chute bottom 130 is provided with a transverse opening 139 and spaced above the opening 140. Through the opening 139 passes a blade 141 having a stem 142 connected by a pin and slot connection 143 with one arm of the lever 138. Through the other opening 140 extends a blade 144 having a stem 145 which is connected to the remaining arm of the lever 138 by a pin and slot connection 146. With this arrangement when the blade 141 is raised as in Figure 9 the blade 144 will be depressed. This will retain the lowermost shell in the chute in a position to rest on the blade 141. However, when the blade 141 is depressed the blade 144 will be simultaneously projected upwardly and cut off remaining shells in the chute as indicated in Figure 10. In order to actuate these blades in the manner set forth the stem 142 extends well down below the bell crank and is connected to a lever 147. The lever 147 is pivoted to the carriage at 148 and is urged upwardly by a coil spring 149 as shown in Figure 3. Extending upwardly from the free end of the lever 147 is a link 150 the upper end of which is connected to the downwardly extending portion of a rack member 151 meshing with the gear 133. This rack member is secured by a pivot bolt 152 so that the rack can engage with and be disengaged from the gear 133. Extending from the link 150 is a rock arm 153. Attached to the gun and extending through a slot 154 formed in the carriage is an arm 155 having a downwardly bent end 156 which engages with the lever 147 through a member 157 to depress the lever, as shown in Figure 8, when the gun recoils. This causes engagement of the arm 153 in such manner as to tilt the link 150 on the bolt 152 and thus swing the rack member 151 into and out of engagement with the gear 133.

Referring now especially to Figures 7 and 14 to 17 it is to be noted that the gun consists of two separable parts, a longer muzzle section 158 and a shorter breech section 159. The muzzle section at its rear end is provided with a frusto-conical bore 160 and the breech section is provided with a frusto-conical forward end 161 which fits tightly in the frusto-conical bore when the two parts of the gun are brought together. In order to hold these parts properly together during the operation the breech section 159 is provided on each side with a lateral lug 162 adjacent its forward end. Pivoted to the muzzle section adjacent its rear end is a pair of latch levers 163, there being one lever on each side, and these levers normally engage the lugs 162 thus holding the breech and muzzle together. On the interior on each side of the carriage 24 and in the top 25 is formed an inclined cam groove 164 the lower face of which engages the nose of the respective latch lever 163 as the gun moves backward during recoil. If the gun is in position for firing parts are shown as in Figure 14. After the gun has been fired the parts will be in the position shown in Figure 16, the breech being thus released from the muzzle end. Now as previously pointed out the gun is moved to protracted position by means of the mechanism illustrated in Figure 21. When the parts are in the position of Figure 16 as shown in full lines the breech and muzzle sections are still together but ready for separation. The protraction mechanism of Figure 21 is then free to act on the muzzle section whereupon the parts will assume the positions indicated in broken lines in Figure 16.

In the operation of the device the direction of gun fire is controlled as previously described. When in the proper position with the breech and muzzle sections together as in Figure 17 a projectile will lie in the rear end of the muzzle. Now by closing the circuit closer 127 the explosive charge which has been received in the breech 159 will explode and the projectile will be driven out of the gun while at the same time the two sections of the gun will travel rearwardly due to recoil to the position shown in Figure 16, the muzzle section immediately being protracted while the breech section remains in a position toward the rear of the carriage 24. This leaves a space between the two gun sections at which time the apparatus for delivering the projectiles comes into play and the lowermost projectile at the bottom of the chute 130 will be delivered into this space. The breech portion of the gun then moves forward and acts to force the projectile forward into its seat at the rear of the muzzle section. The forward movement of the breech joins the two sections of the gun and the latch levers 163 engage the lugs 162 and lock the two sections together for firing the newly introduced projectile.

It is to be understood that the words "gear" or "gears" alone, wherever appearing in this specification, are used in a broad sense, meaning specifically plates having bevelled portions, which are lined with suitable material, such as brake lining.

What is claimed is:

A gas explosion means for a gun mounted on a carriage, said means including a valve casing extending from a side of the gun, said carriage having a longitudinal slot therein wherein the valve casing moves as the gun reciprocates, an inwardly opening check valve at the inner end of the casing, a stem projecting from said valve through the opposite end of the casing, a charge holding tube opening into said casing and extending rearwardly along the carriage, a charge forming and compressing cylinder having tubular connection with the free end of said tube, a piston on said tubular connection within the tube, a second piston in said cylinder, a solid piston rod extending forwardly from the said cylinder and having the second piston fixed thereto, a reservoir for gas, a separate pipe connection between the reservoir and the rear end of the cylinder and including a needle valve and an inwardly opening check valve at the cylinder, a second similar check valve in the rear end of the cylinder for admitting air to the cylinder, a housing supported from the carriage for longitudinal sliding movement below said cylinder, means connecting the forward ends of said housing and piston rod, a rack extending longitudinally in said housing, a shaft supported in said carriage, a main shaft supported from the rotary platform parallel to the carriage, and a gear train connecting the main shaft and the last mentioned shaft, cam means operable by said gear train for reciprocating said pistons, said gear train including a pair of coacting bevel gears and manual means for moving said bevel gears into and out of mesh.

References Cited in the file of this patent

UNITED STATES PATENTS

| Number | Name | Date |
|---|---|---|
| 933,741 | Voller | May 30, 1911 |
| 1,723,623 | Kennedy | Aug. 6, 1929 |
| 1,749,137 | Hudson | Mar. 4, 1930 |
| 1,821,521 | Mackine | Sept. 1, 1931 |
| 2,088,503 | Broussard | July 27, 1937 |
| 2,362,075 | Keahey | Nov. 7, 1944 |
| 2,433,637 | Trotter | Dec. 30, 1947 |
| 2,452,147 | Reinhold | Oct. 26, 1948 |
| 2,469,333 | Farrell | May 3, 1949 |
| 2,502,891 | Sanford | Apr. 4, 1950 |
| 2,503,116 | Maillard | Apr. 4, 1950 |